(12) United States Patent
Itoh

(10) Patent No.: US 7,227,943 B2
(45) Date of Patent: Jun. 5, 2007

(54) TONE DETECTOR

(75) Inventor: Masanori Itoh, Kanagawa (JP)

(73) Assignee: Ricoh Company, Ltd., Tokyo (JP)

(*) Notice: Subject to any disclaimer, the term of this patent is extended or adjusted under 35 U.S.C. 154(b) by 249 days.

(21) Appl. No.: 10/309,891

(22) Filed: Dec. 5, 2002

(65) Prior Publication Data
US 2003/0118162 A1 Jun. 26, 2003

(30) Foreign Application Priority Data
Dec. 6, 2001 (JP) ............................. 2001-373222

(51) Int. Cl.
*H04M 3/22* (2006.01)
(52) U.S. Cl. ..................... 379/386; 379/377
(58) Field of Classification Search ............... 379/386
See application file for complete search history.

(56) References Cited

U.S. PATENT DOCUMENTS

| | | | |
|---|---|---|---|
| 5,325,427 A * | 6/1994 | Dighe | ........................ 379/386 |
| 5,742,801 A | 4/1998 | Fukushima et al. | |
| 6,370,244 B1 * | 4/2002 | Felder et al. | ................ 379/386 |

FOREIGN PATENT DOCUMENTS

| | | |
|---|---|---|
| JP | 55-141853 | 11/1980 |
| JP | 56-131286 | 10/1981 |

* cited by examiner

*Primary Examiner*—Sinh Tran
*Assistant Examiner*—Walter F Briney, III
(74) *Attorney, Agent, or Firm*—Dickstein Shapiro LLP

(57) ABSTRACT

The present invention provides a tone detector that is capable of performing accurate tone signal detection in a short period of time. Specifically, the tone detector according to the present invention includes: a control unit that measures the tone signals using a plurality of channels having a predetermined measuring time interval, which are shifted by a fixed time period, and reads out the tone signals stored in a memory unit for each of the measuring time intervals; detection processing units that determine the characteristic quantity of the tone signals read out by the control unit; and a tone determination unit that identifies the tone signal for each of the plurality of channels based on the characteristic quantity determined in the detection processing units. In this tone detector, the tone signals are measured using a plurality of channels wherein the measuring time interval of each channel is shifted by a fixed time period after which the tone signal is identified. Thus, the detection result can be obtained after every predetermined time period for each of the shifted channels thereby realizing the tone detection at short time intervals while still maintaining the required measuring time for the tone signal detection.

24 Claims, 5 Drawing Sheets

TONE DETECTOR

BACKGROUND OF THE INVENTION

1. Field of the Invention

The present invention relates generally to a tone detector and particularly to a tone detector capable of accurately detecting tone signals in a short period of time.

2. Description of the Related Art

In a communication apparatus such as the facsimile machine, tone signals need to be detected in order to perform communication such as data transmission/reception. In the following, a description of the conventional tone signal detection method is given with reference to FIG. 1.

Figure 1:
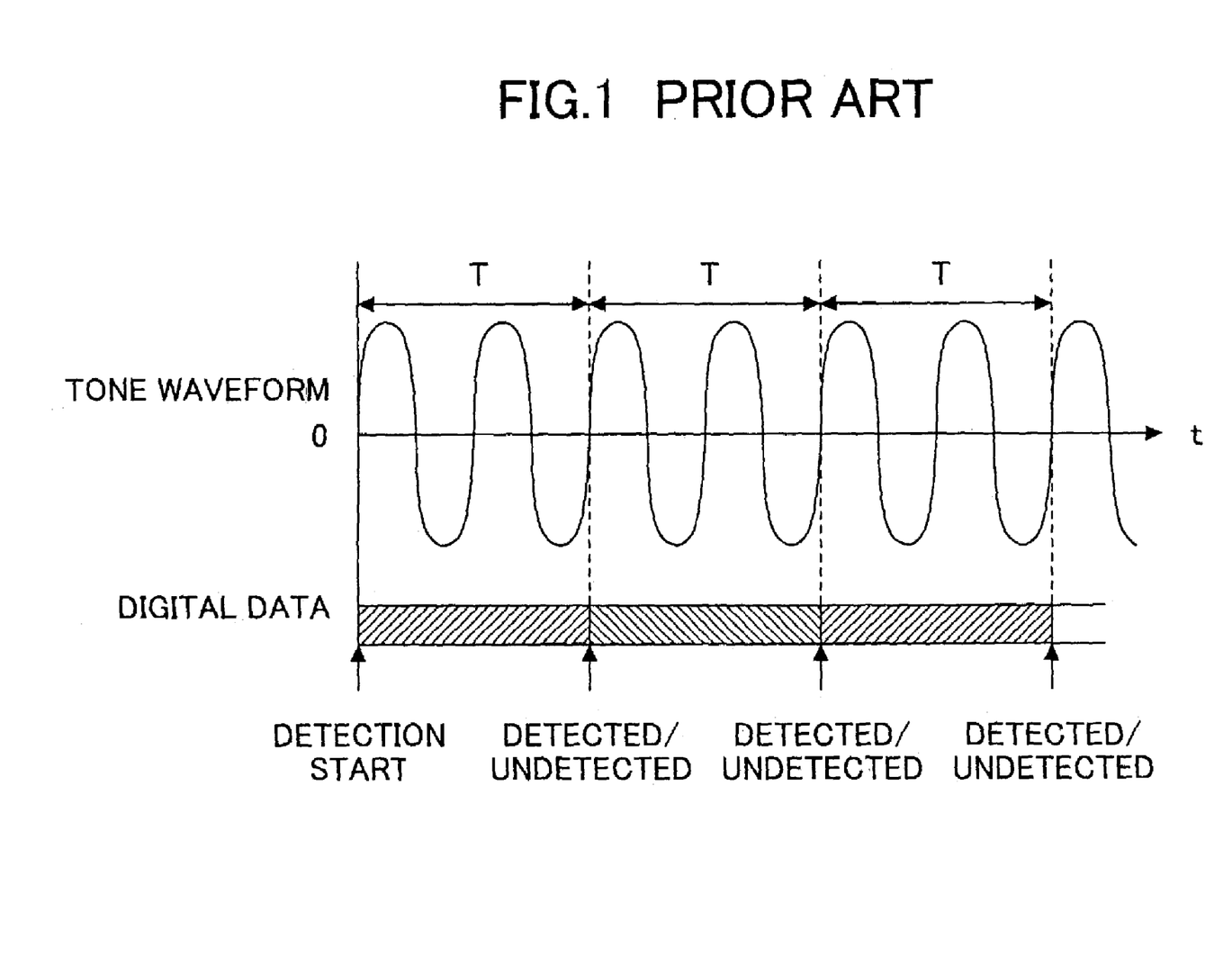
FIG. 1 is a schematic diagram illustrating an exemplary method of detecting a tone signal according to the conventional art.

FIG. 1 is a schematic diagram illustrating the measuring time for identifying the tone signal according to the conventional art. The tone signals are measured in each fixed time period T into which the measuring time is divided as indicated in the drawing, and the type of tone signal is determined in each time period T based on the above measuring results.

However, the above tone signal detection method is time consuming since it requires time T to measure the tone signal.

On the other hand, if the measuring time T is shortened in order to speed up the tone signal detection, an accurate measurement cannot be made. Thus, in the conventional art, it has been impossible to accurately identify a tone signal in a short measuring time period.

SUMMARY OF THE INVENTION

The object of the present invention is to realize tone detection in a short period of time while maintaining the required measuring time by performing parallel detection processes through time shifting.

To this end, the tone detector according to the present invention includes:

a memory unit that stores a tone signal successively input to the tone detector;

a control unit that reads out the tone signal from the memory unit at a predetermined measuring time interval for each of a plurality of measuring channels, said channels being shifted by a fixed time period;

a characteristic quantity detection unit that receives the tone signal read out by the control unit at the predetermined measuring time interval for each of the channels and determines the characteristic quantity of said tone signal; and a tone determination unit that identifies the tone signal based on the characteristic quantity determined by said characteristic quantity detection unit for each of the channels.

Also, in the present invention, the above control unit may read out the tone signal for each fixed time period by which the measuring time interval is shifted; the above characteristic quantity detection unit may determine the characteristic quantity of the tone signal for each fixed time period; and the tone determination unit may identify the tone signal for each of said fixed time periods.

Additionally, in the present invention, the characteristic quantity detection unit may co-perform the determination of the tone signal characteristic quantity for the fixed time period in which the processes overlap within the measuring time intervals of the channels.

Further, in the present invention, the control unit may subdivide the fixed time period into time units in which the characteristic quantity detection unit is able to perform a tone signal detection and may read out the tone signal for each subdivided time unit; the characteristic quantity detection unit may determine the characteristic quantity of the tone signal for each subdivided time unit; and the tone determination unit may identify the tone signal for each subdivided time unit.

Additionally, the characteristic quantity detection unit may co-perform the determination of the tone signal characteristic quantity for said subdivided time unit in which the processes overlap within the measuring time intervals of the plurality of channels.

Also, the characteristic quantity detection unit may determine the characteristic quantity of the frequency, the amplitude, or the phase of the tone signal.

Additionally, the tone determination unit may identify the tone signal when the characteristic quantity is determined in the characteristic quantity detection unit for all the tone signals within the measuring time interval in each of the channels.

Also, the tone determination unit may identify the tone signal based on the characteristic quantity determination result in said characteristic quantity detection unit from a plurality of said measuring time intervals.

Further, the tone detector according to the present invention includes:

a control unit further having a tone signal inputting function for inputting the received input tone signal into the tone detector, a tone data inputting function for inputting data created from the tone signal into a memory unit, a tone data reading out function for reading out data stored in the memory unit, and a tone data inputting function for inputting stored data read out of the memory unit into other units for further data processing, with the tone signal data reading out and inputting functions occurring at a series of predetermined measuring time intervals or group of time intervals, with each series being a separate channel and each series being shifted from another by a fixed time period;

the memory unit, in communication with the control unit, hat stores the input tone signal and input tone signal data created from the input tone signal;

a characteristic quantity detection unit, in communication with the control unit, that determines the characteristic quantity of said tone signal data for each of the channels; and, a tone determination unit, in communication with the control unit, that identifies the tone signal based on the characteristic quantity determined by said characteristic quantity detection unit for each of the channels.

DESCRIPTION OF THE PREFERRED EMBODIMENTS

In the following, the preferred embodiments of the present invention are described with reference to the accompanying drawings.

Figure 2:
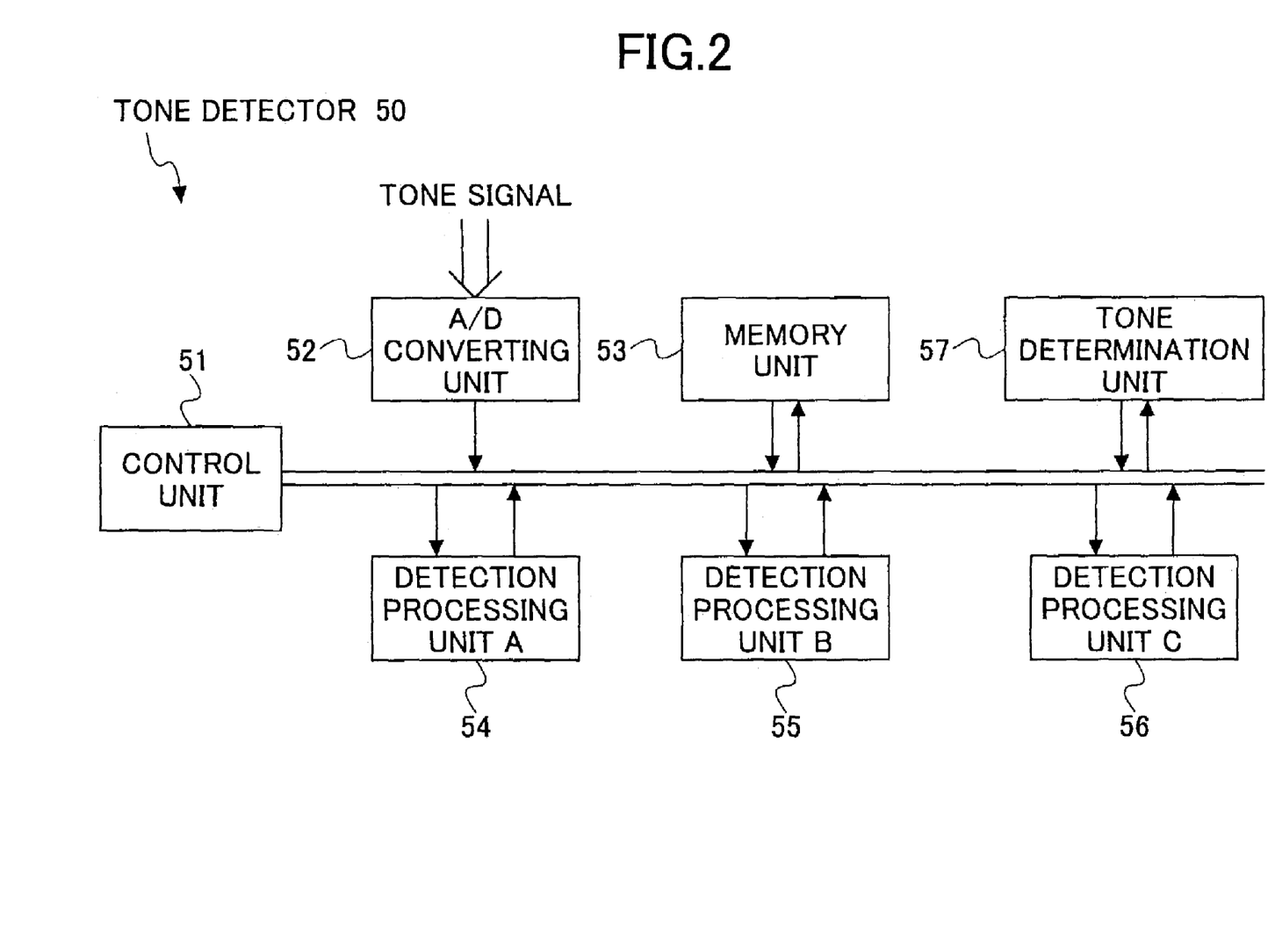
FIG. 2 is a block diagram of a tone detector according to an embodiment of the present invention.

FIG. 2 shows the structure of a tone detector according to an embodiment of the present invention. Tone detector 50 of FIG. 2 is an exemplary device for identifying the tone signal according to the present invention.

As shown in FIG. 2, the tone detector 50 comprises a control unit 51, an A/D converting unit 52, a memory unit 53, a detection processing unit A 54, a detection processing unit B 55, a detection processing unit C 56, and a tone determination unit 57.

The control unit 51 is in control of the entire operation of the tone detector 50, and the A/D converting unit 52 converts the tone signals into digital data. The memory unit 53 stores the digitally-converted signal data and the detection processing results. The detection processing unit A 54, the detection processing unit B 55, and the detection processing unit C 56 perform parallel detection processes. The tone determination unit 57 determines the tone signal.

Figure 3:
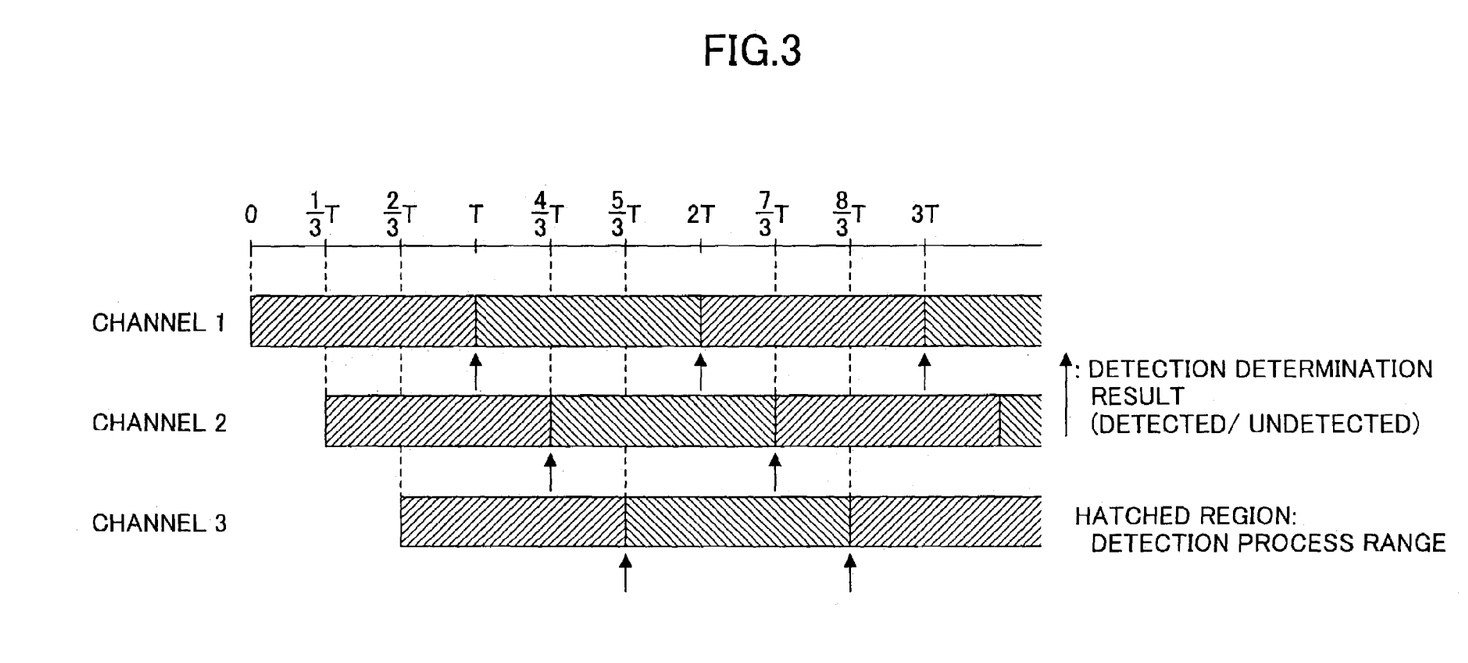
FIG. 3 is a schematic diagram illustrating a tone detection method according to the present invention.

FIG. 3 illustrates the tone detection method according to a first embodiment of the present invention.

In FIG. 3, time T is the required measuring time and three parallel detection processing channels are used. The uppermost bar in FIG. 3 represents the operation of the detection process of channel 1, which starts at time 0. In this channel the tone signal is measured until reaching time T after which the tone signal is identified based on the obtained data from the above measurements. Similarly, during the period from time T to time 2T, the signals are measured and the tone signal is identified based on this measurement data. The detection process of channel 1 is successively performed in this manner.

Also, the middle bar in FIG. 3 indicates the operation of the detection process of channel 2, which is shifted forward by T/3 with respect to channel 1 so that the operation starts at time T/3 and the signal is measured until time 4T/3. The tone signal is then identified based on this measurement data. Similarly, the signal measurement is also performed during the next time period from time 4T/3 to time 7T/3 after which the tone signal is identified based on the obtained data. The detection process of channel 2 is performed successively in this manner.

The bottom bar in FIG. 3 represents the operation of the detection process of channel 3, which is further shifted by T/3 with respect to channel 2 so that the operation starts at time 2T/3 and the signal is measured until time 5T/3. The tone signal is then identified based on the above obtained data. Similarly, the signal measurement is performed during the next time period from 5T/3 to 8T/3 and the tone signal is identified based on the above data. The detection process of channel 3 is performed successively in this manner.

In the above embodiment, one channel has newly updated signal information for the time shift of T/3 with respect to the other channels; thus, the signal change measured in the above time influences the determination of whether a signal is detected or undetected.

Thus, the tone signal is detected by combining the detection processing operation of channels 1, 2, and 3. When detection is initiated at time 0, the detection result can be obtained at time T from the detection process of channel 1, subsequently followed by the detection result from channel 2 at time 4T/3, and the detection result from channel 3 at time 5T/3. Further, the detection result can be obtained at time 2T from the detection process of channel 1, followed by the detection result from channel 2 at time 7T/3, and the detection result from channel 3 at time 8T/3.

By successively performing the detection process in the above manner, the detection result can be obtained more frequently at shorter time intervals since new detection results are generated after every T/3 time period even though each of the channels performs the detection process for the required measuring time T. In other words, in this embodiment the detection result can be obtained at intervals of time period T/3. In the above description, three channels are used for the detection processing; however, it is also possible to use more than three channels. This enables detection at even shorter time intervals.

In the following, a description of the operational control performed by the tone detector of FIG. 2 upon implementing the tone detection method of FIG. 3 is given.

Upon the initiation of the tone detection process, first of all, the control unit 51 inputs the tone signals to the A/D converting unit 52 and commands it to perform an A/D conversion. The A/D converting unit 52 receiving the above command performs the A/D conversion. The signal data that has undergone the A/D conversion is iteratively accumulated in the memory unit 53 by means of the control unit 51. At the same time, the control unit 51 checks to see how much signal data is accumulated in the memory unit 53.

After the accumulation of the signal data for the duration of measuring time T, the control unit 51 reads the data accumulated in the memory unit 53 from time 0 to time T, and sends this to the detection processing unit A 54 wherein a process of determining the characteristics of the frequency domain is initiated. When the detection process is completed in the detection processing unit A 54, this is notified to the control unit 51. The control unit 51 receiving the above notification sends the detection processing result to the tone determination unit 57 wherein the tone signal is identified. When the tone detection determination process is completed, tone determination unit 57 notifies this to the control unit 51 and also sends the determination result. In this way a sequence of the detection process of channel 1 is completed.

Also, after the signal data have been accumulated in the memory unit 53 until time 4T/3, the control unit 51 reads the data accumulated in the memory unit 53 from time T/3 to time 4T/3 and sends this to the detection processing unit B 55 wherein a process of determining the characteristics of the frequency domain is initiated. When the detection process is completed in the detection processing unit B 55, this is notified to the control unit 51. The control unit 51 receiving the above notification sends the detection process result to the tone determination unit 57 wherein the tone signal is identified. When the tone detection determination process is completed, tone determination unit 57 notifies this to the control unit 51 and also sends the determination result of the above process. In this way, a sequence of the detection process of channel 2 is completed.

Further, after the accumulation of the signal data in the memory unit 53 until time 5T/3, the control unit 51 reads the data accumulated in the memory unit 53 from time 2T/3 to time 5T/3 and sends this to the detection processing unit C 56 wherein a process of determining the characteristics of the frequency domain is initiated. When the detection process is completed in the detection processing unit C 56, this is notified to the control unit 51. The control unit 51 receiving the above notification sends the detection process result to the tone determination unit 57 wherein the tone signal is identified. When the tone detection determination process is completed, tone determination unit 57 notifies this to the control unit 51 and also sends the determination result of the above process. In this way a sequence of the detection process of channel 3 is completed.

Similarly, the data accumulated from time T to 2T are processed in the detection processing unit A 54, the data accumulated from time 4T/3 to 7T/3 are processed in the detection processing unit B 55, the data accumulated from time 5T/3 to 8T/3 are processed in the detection processing unit C 56, the data accumulated from time 2T to 3T are processed in the detection processing unit A 54, the data accumulated from time 7T/3 to 10T/3 are processed in the detection processing unit B 55, the data accumulated from time 8T/3 to 11T/3 are processed in the detection processing unit C 56, and so on. In this way, the accumulated signal data shifted by T/3 are successively processed in three different detection processing units. Thus, the control unit 51 is able to maintain the required measuring time T for the detection process in each of the channels while generating the detection results at every T/3 interval starting from time T, then, time 4T/3, 5T/3, 2T, 7T/3, 8T/3 . . . and so on.

In the above embodiment, three different channels corresponding to the detection processing units A 54, B 55, and C 56 are used in the parallel processing; however, the present invention does not necessarily limit the above number to three different channels. By increasing the number of parallel processes, the detection of tone signals can be performed at even shorter time intervals. Also, in the detection processing units A 54, B 55, and C 56, the characteristics of the tone signals are determined in the frequency domain since in this example, tone signal determination is performed based on the difference in frequencies as in the most conventional case. However, the detection processing units may also determine the characteristics of the tone signal in the amplitude domain or the phase domain.

Further, in the above example, the tone determination unit 57 carries out detection determination each time one of the detection processing units A 54, B 55, or C 56 outputs the processing result at time interval T; however, in another embodiment, the control unit 51 may store the results obtained from the detection processing units A 54, B 55, and C 56 in the memory unit 53 and may send the processing results to the tone determination unit 57 after multiple results have been accumulated in the memory unit 53, to cause the tone determination unit 57 to perform the determination process. In this case, the determination can be made based on data obtained from a plurality of measuring time periods, thereby enabling detection determination in a time domain. In this way, abnormalities in the time domain due to the absence of a signal or the intermingling of another signal can be detected and a more thorough determination can be made.

In the following, a description of the tone detection method according to the second embodiment of the present invention is given with reference to FIG. 4.

Figure 4:
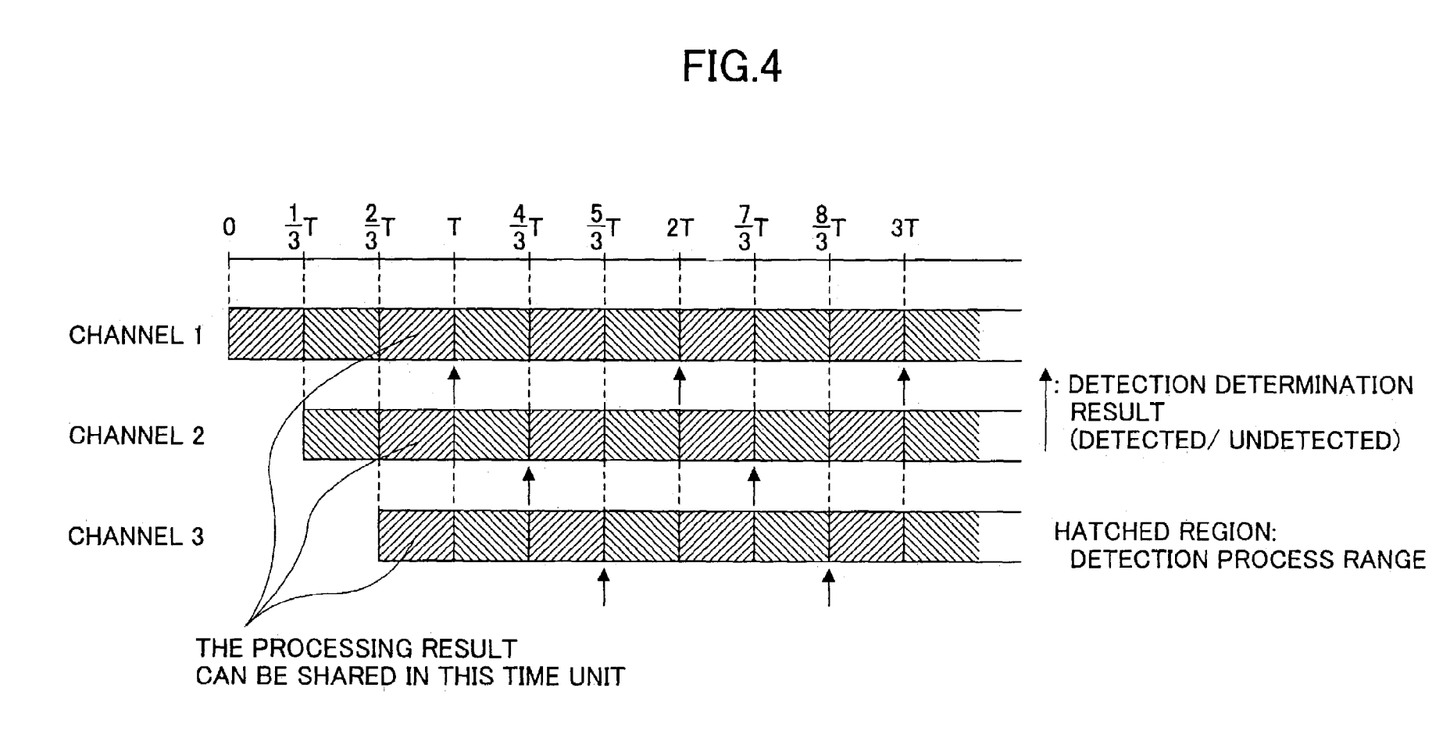
FIG. 4 is a schematic diagram illustrating a tone detection method according to the present invention; and, FIG. 5 is a schematic diagram illustrating a tone detection method according to the present invention.

FIG. 4 illustrates the tone detection method wherein the required measuring time T is divided into a number of channels. In FIG. 4, since there are three channels, the measuring time T is divided into three T/3 time periods. In this case, the detection process is performed at every time period T/3 in each of the channels so that in channel 1, the detection is performed for each of the time periods 0–T/3, T/3–2T/3, and 2T/3–T; in channel 2, it is performed for each of the time periods T/3–2T/3, 2T/3–T, and T–4T/3; and in channel 3, it is performed for each of the time periods 2T/3–T, T–4T/3, and 4T/3–5T/3.

In channel 1, the above process is completed after every elapse of time period T/3 so that the processing results are generated at time T/3, 2T/3, and T. The tone signal is identified based on the above processing results. In this embodiment, if the determination is performed at time 2T/3 using the processing results obtained at time T/3 and 2T/3 and the tone is detected, then the detection processing and determination for the time period of 2T/3–T becomes unnecessary. In this way, the detection determination can be made in an even shorter time period although the accuracy of the information is degraded since the measurement is not made for the entire measuring time T. Also, since the unnecessary processes are omitted, the overall process quantity can be reduced thereby improving the efficiency of the process.

Further, the processing result from time T/3 to 2T/3 in channel 1 is the same as the processing result from time T/3 to 2T/3 in channel 2, and in the next time period, the processing result from time 2T/3 to T in channel 1 is the same as that of channel 2 and channel 3. Thus, the computation process can be shared and the overall computation quantity can be decreased, thereby improving the efficiency of the computation.

In the following a description of the operational control performed by the tone detector of FIG. 2 upon implementing the above tone detection method is given.

Upon the initiation of the tone detection, the control unit 51 commands the A/D converting unit 52 to perform an A/D conversion on the tone signals input therein and then stores the A/D converted digital signal data in the memory unit 53. At the same time, the control unit 51 iteratively checks to see how much signal data are accumulated in the memory unit 53.

When the data are accumulated from time 0 to T/3, the control unit 51 hands down the accumulated data to the detection processing unit A 54 wherein the process of determining the characteristics of the frequency domain is initiated. Upon the completion of the detection process, the detection processing unit A 54 notifies this to the control unit 51. The control unit receiving this notification stores the processing result in the memory unit 53 and also sends this to the tone determination unit 57 so that it performs detection determination. When detection is determined in this process, this is notified to the control unit 51. When there is no detection determined in the above process, the tone, determination unit 57 does not take any action.

Next, when the data are accumulated from time T/3 to 2T/3, the control unit 51 hands the accumulated data to the detection processing unit A 54 and the detection processing unit B 55 and commands the initiation of the process of determining the characteristics of the frequency domain in each of the detection processing units. Upon the completion of the detection process, each of the detection processing units notifies this to the control unit 51. The control unit 51 receiving this notification stores each of the detection processing results in the memory unit 53 and also takes out the detection processing results of the data obtained in the time period of time 0–T/3 stored in the memory unit 53 and sends this together with the present processing result to the tone determination unit 57 so that the tone signal is identified. When tone signal detection is determined in this process, this is notified to the control unit 51. When there is no tone signal identified in the above process, the tone determination unit 57 does not take any action.

Further, when the data are accumulated from time 2T/3 to T, the control unit 51 hands the accumulated data to the detection processing unit A 54, the detection processing unit B 55, and the detection determination unit C 56 and commands the initiation of the process of determining the characteristics of the frequency domain in each of the detection processing units. Upon the completion of the detection process, each of the detection processing units notifies this to the control unit 51. The control unit 51 receiving this notification stores each of the detection processing results in the memory unit 53 and also takes out the detection processing results of the data obtained in the time period of time 0–T/3 and T/3–2T/3 stored in the memory unit 53 and sends this together with the present processing result to the tone determination unit 57 so that the tone signal detection is determined. When tone signal detection is determined in this process, this is notified to the control unit 51. When there is no tone signal detected in the above process, the tone determination unit 57 does not take any action. In this way, the detection process of the first channel is completed.

Next, when the signal data are accumulated from time T to 4T/3, the control unit 51 hands down the accumulated data to the detection processing unit A 54, the detection processing unit B 55, and the detection processing unit C 56 and commands the initiation of the process of determining the characteristics of the frequency domain in each of the detection processing units. Upon the completion of the detection process, each of the detection processing units notifies this to the control unit 51. The control unit 51 receiving this notification stores each of the detection processing results in the memory unit 53 and also takes out the detection processing results of the data obtained in the time period of time T/3–2T/3 and 2T/3–T stored in the memory unit 53 and sends this together with the present processing results to the tone determination unit 57 so that the tone signal detection is determined. When detection is determined in this process, this is notified to the control unit 51. When there is no detection determined in the above process, the tone determination unit 57 does not take any action. In this way, the detection process of the second channel is completed.

Further, when the data are accumulated from time 4T/3 to 5T/3, the control unit 51 hands the accumulated data to the detection processing unit A 54, the detection processing unit B 55, and the detection determination unit C 56 and commands the initiation of the process of determining the characteristics of the frequency domain in each of the detection processing units. Upon the completion of the detection process, each of the detection processing units notifies this to the control unit 51. The control unit 51 receiving this notification stores each of the detection processing results in the memory unit 53 and also takes out the detection processing results of the data obtained in the time period of time 2T/3–T and T–4T/3 stored in the memory unit 53 and sends this together with the present processing result to the tone determination unit 57 so that the tone signal detection is determined. When detection is determined in this process, this is notified to the control unit 51. When there is no detection determined in the above process, the tone determination unit 57 does not take any action. In this way, the detection process of the third channel is completed.

In this manner, the above processes are performed simultaneously and parallel to each other in the detection determination processing units A 54, B 55, and C56 at each T/3 time interval, wherein the processing results are stored in the memory unit 53. In this embodiment, the detection determination is successively performed in each of the channels. Thus, as in the first embodiment of the present invention, detection can be made in the control unit 51 at every time interval of T/3 starting from time T, then at time 4T/3, 5T/3, 2T, 7T/3, 8T/3 . . . and so on.

Also, in this embodiment, the detection processing result is stored in the memory unit 53 at each T/3 time interval, and is sent along with the previously acquired processing results to tone determination unit 57 wherein the tone signal is identified. This degrades the accuracy of the detection determination since the data accumulated until measuring time T is not entirely used; however, the detection determination can be made at shorter time intervals. Also, once detection is determined, the process within measuring time T that is to be performed after this detection determination becomes unnecessary and the overall processing quantity can be reduced thereby improving the efficiency of the process.

Also, in this embodiment, parallel processing is performed by three detection processing units A, B, and C that correspond to three different channels; however, the present invention does not limit the number of channels to three. Moreover, by increasing the number of channels, detection can be made at an even shorter time interval. Additionally, in the above example, the detection processing units A 54, B 55, and C 56 perform a process of determining the characteristics of the frequency domain; however, they may also determine the characteristics of the amplitude domain or the phase domain.

Further, the detection determination process is performed in the determination unit 57 using the results obtained in each of the detection processing units A 54, B 55, and C 56 at every time interval T; however, the control unit 51 may send the results obtained from a longer time interval to the determination unit 57 for the determination process. In this case, the determination process can be performed based on data obtained from a plurality of time periods T so that detection determination in a time domain is possible. In turn, a more detailed determination is possible since abnormalities in the time domain such as the absence of a signal or the intermingling of another signal can be detected.

Also, in this embodiment, parallel processing is performed in each of the detection processing units A 54, B 55 and C 56. However, the process during the time interval from T/3 to 2T/3 is performed in both the detection processing units A 54 and B 55, and the process during the time interval from 2T/3 to T is performed in all the detection processing units A 54, B 55, and C 56. In other words, the same process is performed in each of the different processing units. Therefore, the process for the same time period may be performed in only one of the processing units and the obtained processing result may be shared by the channels. In this way, the execution of a plurality of identical processes can be avoided thereby eliminating redundancies and increasing the efficiency of the process.

Figure 5:
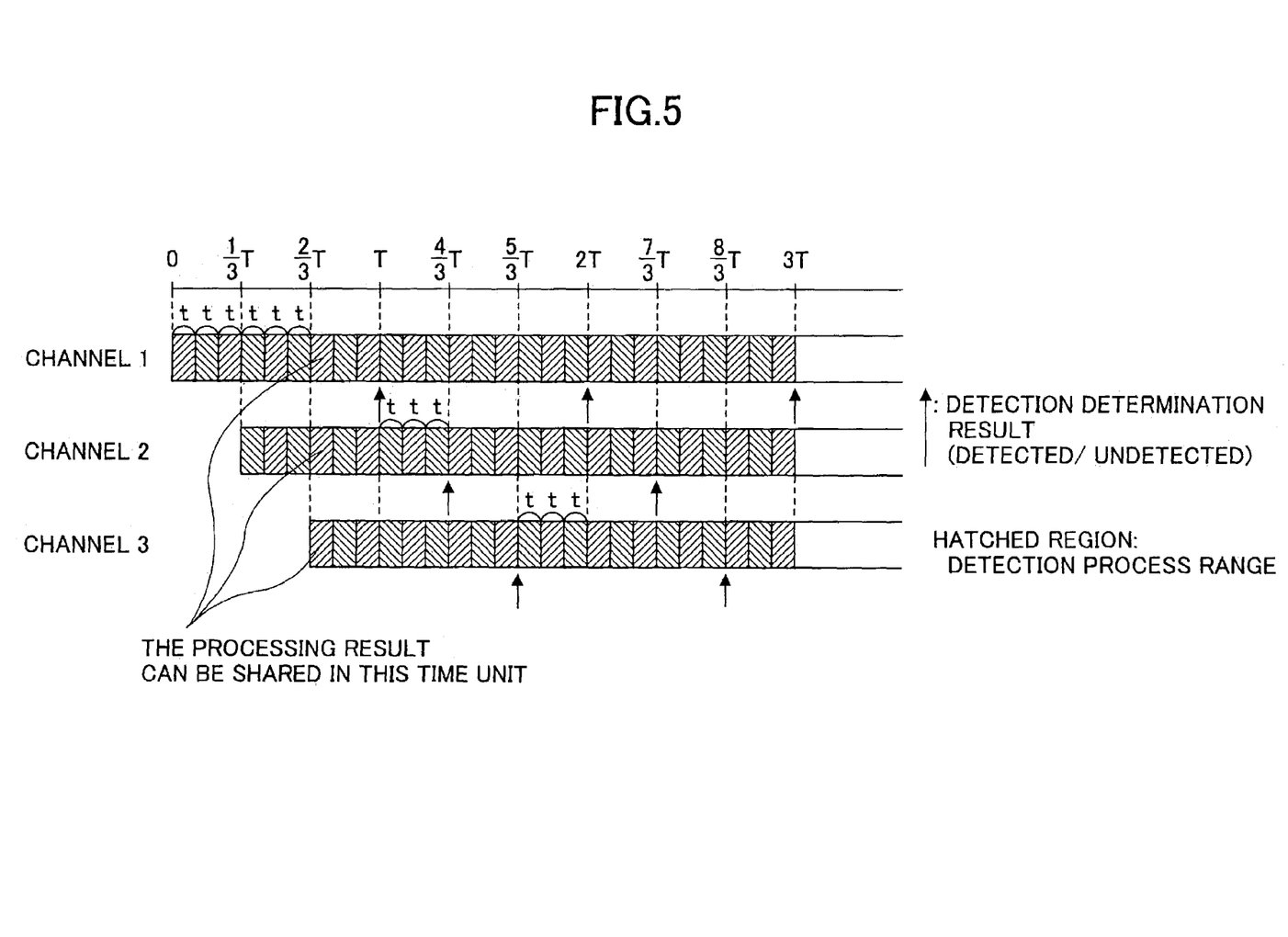

Next, with reference to FIG. 5, a description of the tone detection method according to the third embodiment of the present invention is given.

FIG. 5 illustrates the tone detection method wherein the measuring time T is further divided into a plurality of time periods. In FIG. 5 the measuring time is subdivided into blocks of detection processing time t and parallel processing is performed by three different channels. In this embodiment, the measuring time T is subdivided into detection processing time period t and when signals are input for the duration of the above subdivided time period t, the detection process can be iteratively performed using the data obtained during this time period t. In other words, in channel 1 the detection process is performed for each detection processing time period t starting from time 0–t, then at time t–2t, time 2t–3t, and so on. The tone signal is identified based on the accumulated detection processing results. In this way, only the computation processing results for each time period t needs to be stored, or the computation processing result can be updated after each time period t. This increases the efficiency of the process since it will be unnecessary to store large quantities of measurement data that take up a large portion of the memory.

Also, by setting time period t so that the number of time periods t within the measuring time T is an integral multiple of the number of channels, the detection processing result from the subdivided time period t can be shared by all the channels. In this way, the necessity of performing a detection process in each channel can be eliminated and the efficiency of the process can be greatly increased, thereby enabling the parallel processing of many channels even in a device with low computation capabilities.

In the following, the operational control performed by the tone detector of FIG. 2 upon implementing the above tone detection method is described.

Upon the initiation of the tone detection, the control unit 51 commands the A/D converting unit to perform an A/D conversion on the input tone signals and sends the A/D converted digital signal data to the detection processing unit A 54. The detection processing unit A 54 starts determining the characteristics of the frequency domain using the data obtained until reaching the time unit t, the smallest time unit that allows computational processing to be performed. Upon the completion of the above detection process, the detection processing unit A 54 notifies this to the control unit 51. The control unit 51 receiving this notification stores the detection processing result in the memory unit 53 and also sends this to the tone determination unit 57 for the detection determination. If detection is determined in the above process, this is notified to the control unit 51. If no detection is determined in the above process, no action is taken. A similar process is performed for every time unit t; thus, after time t, a similar process is performed at time 2t, 3t, 4t, and so on.

Also, at time T/3, the control unit 51 sends the A/D converted digital signal data to the detection processing units A 54 and B 55. In each of the detection processing units A 54 and B 55, a process of determining the characteristics of the frequency domain is performed using the signal data obtained until reaching time T/3+t. Upon the completion of the above detection process, each of the detection processing units A 54 and B 55 notifies this to the control unit 51. The control unit 51 receiving this notification stores each of the above processing results in the memory unit 53 and also sends this to the tone determination unit 57 for the detection determination. If detection is determined in the above process, this is notified to the control unit 51. If no detection is determined in the above process, no action is taken. A similar process is performed for every time unit t; thus after time T/3+t, a similar process is performed at time T/3+2t, T/3+3t, T/3+4t, and so on.

Further, at time 2T/3, the control unit 51 sends the A/D converted digital signal data to the detection processing units A 54, B 55, and C56. In each of the detection processing units A 54, B 55, and C56, a process of determining the characteristics of the frequency domain is performed using the signal data obtained until reaching time 2T/3+t. Upon the completion of the above detection process, each of the detection processing units A 54, B 55, and C 56 notifies this to the control unit 51. The control unit 51 receiving this notification stores each of the above processing results in the memory unit 53 and also sends this to the tone determination unit 57 for the detection determination.

If detection is determined in the above process, this is notified to the control unit 51. If no detection is determined in the above process, no action is taken. A similar process is performed for every time unit t; thus after time 2T/3+t, a similar process is performed at time 2T/3+2t, 2T/3+3t, 2T/3+4t, and so on.

By continuing the above-described process until time T, the detection process in the first channel for the duration of time T is completed. When a similar process is continued until time 4T/3, the detection process in the second channel is completed. Further, when the process is continued until time 5T/3, the detection in the third channel is completed.

In this way, detection is possible in the control unit 51 every T/3 time interval starting from T, then 4T/3, 5T/3, 2T, 7T/3, 8T/3 . . . and so on. Also, since the measurement time interval T is subdivided into time unit t, the smallest time unit that allows computation processing to be performed, only the computation processing result for each time period t needs to be stored, or the computation processing result can be updated after each time period t. This increases the efficiency of the process since it will be unnecessary to store large quantities of measurement data that take up a large portion of the memory.

In the above example, the parallel processes are performed by the three channels corresponding to the detection processing units A 54, B 55, and C 56; however, the number of channels is not limited to three. Moreover, by increasing the number of channels used, the detection can be performed at shorter time intervals. Also, in each of the detection processing unit A 54, B 55, and C 56, a process of determining the characteristics of the frequency domain is performed; however, the process may be of determining the characteristics of the amplitude domain or the phase domain.

Further, in this embodiment, the tone signal is identified in the tone detection unit 57 using the results obtained at intervals of time T from each of the detection processing units A 54, B 55, and C 56; however, the control unit 51 may send the results from a longer time interval than time interval T to the tone determination unit 57 for the detection determination. In this case, the determination process can be performed based on data obtained from a plurality of time periods T so that detection determination in a time domain is possible. In turn, a more detailed determination is possible since abnormalities in the time domain such as the absence of a signal or the intermingling of another signal can be detected.

Further, by setting time unit t so that the number of time units t within measuring time T is an integral multiple of the number of channels, the detection processing result for a subdivided time period t can be stored in the memory unit 53 so that the channels may share the above information with each other. In this way, the necessity of performing a detection process in each channel can be eliminated and efficiency can be greatly increased, thereby enabling parallel processing of many channels even in a device with low computation capabilities.

According to the present invention, a predetermined measuring time interval is shifted by a fixed time period and the measurement of the tone signal is made using a plurality of channels so that the tone signal characteristic quantity is determined and the tone signal is identified based on the above characteristic quantity. In this way, tone detection can be realized at shorter time intervals since the detection results can be obtained at each of the above fixed time periods while the required measuring time for the detection process is still maintained.

Also, according to the present invention, the characteristic quantity of the tone signal is determined for each of the above fixed time periods, after which the tone signal is identified; thus, the tone detection determination can be performed after every elapse of the above fixed time period instead of having to wait until the end of the measuring time interval. When the tone detection is determined before the end of the measuring time interval, it will be unnecessary to perform the rest of the process. This in turn reduces the overall process quantity so that the efficiency of the process can be raised.

Additionally, according to the present invention, the determination of the tone signal characteristic quantity for a fixed time period in the measuring time interval of the plurality of channels that is redundant is co-performed by the detection processing units so that the process quantity can be reduced for the processes that overlap in the above fixed time period and the efficiency of the process can be increased.

Further, according to the present invention, the above fixed time period is further subdivided into time units that can allow detection processing and the determination of the tone signal characteristics quantity is performed in each of the subdivided time units followed by the above tone detection determination; thus, the tone detection determination can be performed for each of the subdivided time units thereby speeding up the tone detection determination. In this way, the processing results only need to be accumulated for the duration of the subdivided time unit before the next tone detection determination is performed or they are updated after every subdivided time unit, thereby sparing the memory capacity.

Also, according to the present invention, the determination of the tone signal characteristic quantity for a subdivided time unit in the measuring time interval of the plurality of channels that is redundant is shared so that the process quantity can be reduced for the processes that overlap in the above time unit and the efficiency of the process can be raised. Also, since the processing quantity of the above process is small, it can be implemented in a device with low processing capabilities.

Additionally, according to the present invention, the characteristic quantity of the frequency of the tone signal is determined and the tone signal is identified. Thus, tone signals having differences and characteristics with respect to their frequency can be detected; in particular, signals that have undergone frequency modulation (FM) can easily be detected in the present invention.

Also, according to the present invention, the characteristic quantity of the amplitude of the tone signal is determined and the tone signal is identified. Thus, tone signals having differences and characteristics with respect to its amplitude can be detected; in particular, signals that have undergone amplitude modulation (AM) can easily be detected in the present invention.

Additionally, the characteristic quantity with respect to the phase of the tone signal is determined and the tone signal is identified. Thus, tone signals having differences and characteristics with respect to its phase can be detected, in particular, signals that have undergone phase modulation (PhM) can easily be detected in the present invention.

Also, according to the present invention, the tone signal is identified upon the detection of the characteristic quantity of all the tone signals within the measuring time interval for each channel. Thus, the tone detection determination result from a measuring time interval can be obtained in its entirety.

Finally, according to the present invention, the tone signal is identified based on the determination results of the characteristic quantity from a plurality of the above measuring time intervals. Thus, the tone detection determination can also be made based on the results obtained from a longer time period, and abnormalities such as the absence of a signal or the intermingling of another signal can be detected, thereby enabling a more thorough determination.

This patent application is based on and claims the benefit of the earlier filing date of Japanese patent application No. 2001-373222 filed Dec. 6, 2001, the entire contents of which are hereby incorporated by reference.

What is claimed is:

1. A tone detector comprising:
a memory unit that stores a tone signal successively input to the tone detector;
a control unit that reads out the tone signal from the memory unit at a predetermined measuring time interval for each of a plurality of measuring channels, said channels being shifted by a fixed time period;
a characteristic quantity detection unit that receives the tone signal read out by the control unit at the predetermined measuring time interval for each of the channels and determines in parallel the respective characteristic quantities of said tone signal for the channels; and
a tone determination unit that identifies the tone signal based on the characteristic quantities determined by said characteristic quantity detection unit for the channels.

2. The tone detector as claimed in claim 1, wherein:
said control unit reads out the tone signal for each fixed time period by which the measuring time interval is shifted;
said characteristic quantity detection unit determines the characteristic quantity of the tone signal for each of said fixed time periods; and,
said tone determination unit identifies the tone signal for each of said fixed time periods.

3. The tone detector as claimed in claim 2, wherein:
said characteristic quantity detection unit co-performs the determination of the tone signal characteristic quantities for said fixed time periods which overlap within the measuring time interval of said plurality of channels.

4. The tone detector as claimed in claim 2, wherein:
said control unit further subdivides said fixed time period into time units in which said characteristic quantity detection unit is able to determine a characteristic quantity, and reads out said tone signal for each of said subdivided time units;
said characteristic quantity detection unit determines the characteristic quantity of the tone signal for each of said subdivided time units; and,
said tone determination unit identifies the tone signal for each of said subdivided time units.

5. The tone detector as claimed in claim 4, wherein:
said characteristic quantity detection unit co-performs the identification of the tone signal characteristic quantities for said subdivided time units which overlap within the measuring time intervals of said plurality of channels.

6. The tone detector as claimed in claim 1, wherein:
said characteristic quantity detection unit determines the characteristic quantity of the frequency of said tone signal.

7. The tone detector as claimed in claim 1, wherein:
said characteristic quantity detection unit determines the characteristic quantity of the amplitude of said tone signal.

8. The tone detector as claimed in claim 1; wherein:
said characteristic quantity detection unit determines the characteristic quantity of the phase of said tone signal.

9. The tone detector as claimed in claim 1, wherein:
said tone determination unit identifies the tone signal when the characteristic quantity is detected in said characteristic quantity detection unit, for all of said measuring time interval, in each of said plurality of channels.

10. The tone detector as claimed in claim 1, wherein:
said tone determination unit identifies the tone signal based on the characteristic quantity determination results in said characteristic quantity detection unit from a plurality of said measuring time intervals.

11. The tone detector as claimed in claim 1, wherein:
each of said measuring channels is respectively shifted by a time period of (M/N)T, where M equals a respective placement in sequence (0, 1, 2, . . . N−1) of the successively shifted channels, N equals the total number of said channels, and T equals the duration of the measuring time interval.

12. A tone detector capable of receiving an input tone signal comprising:
a control unit further having
a tone signal inputting function for inputting the received input tone signal into the tone detector,
a tone data inputting function for inputting data created from the tone signal into a memory unit,
a tone data reading out function for reading out data stored in the memory unit, and a tone data inputting function for inputting stored data read out of the memory unit into other units for further data processing, with the tone signal data reading out and inputting functions occurring at a series of predetermined measuring time intervals or group of time intervals, with each series being a separate channel and each series being shifted from another by a fixed time period;
the memory unit, in communication with said control unit, that stores the input tone signal and input tone signal data created from the input tone signal;
a characteristic quantity detection unit, in communication with said control unit, that determines in parallel the respective characteristic quantities of said tone signal data for the channels; and,
a tone determination unit, in communication with said control unit, that identifies the tone signal based on the characteristic quantities determined by said characteristic quantity detection unit for the channels.

13. The tone detector as claimed in claim 12, wherein:
each of said measuring channels is respectively shifted by a time period of (M/N)T, where M equals a respective placement in sequence (0, 1, 2, . . . N−1) of the successively shifted channels, N equals the total number of said channels, and T equals the duration of the measuring time interval.

14. A tone detector capable of receiving an input tone signal comprising: control means further having tone signal inputting means for inputting the received input tone signal into the tone detector,
tone data inputting means for inputting data created from the tone signal into memory means,
tone data reading out means for reading out data stored in the memory means, and
tone data inputting means for inputting stored data read out of the memory means into other means for further data processing, with the tone signal data reading out and inputting means occurring at a series of predetermined measuring time intervals or group of time intervals, with each series being a separate channel and each series being shifted from another by a fixed time period;
the memory means, in communication with said control means, that stores the input tone signal and input tone signal data created from the input tone signal;
characteristic quantity detection means, in communication with said control means, that determines in parallel the respective characteristic quantities of said tone signal data for the channels; and,
tone determination means, in communication with said control means, that identifies the tone signal based on the characteristic quantities determined by said characteristic quantity detection-means for the channels.

15. The tone detector as claimed in claim 14, wherein:
each of said measuring channels is respectively shifted by a time period of (M/N)T, where M equals a respective placement in sequence (0, 1, 2, . . . N−1) of the successively shifted channels, N equals the total number of said channels, and T equals the duration of the measuring time interval.

16. A tone detector comprising:
a memory unit that stores a tone signal successively input to the tone detector;
a control unit that reads out the tone signal from the memory unit at each of a fixed time period for each of a plurality of measuring channels that are divided into predetermined measuring time intervals, the predetermined time intervals of the channels being shifted with respect to each other by the fixed time period;
a characteristic quantity detection unit that receives the tone signal read by the control unit and determines in parallel the respective characteristic quantities of the tone signal, at each of the fixed time periods, for the channels; and
a tone determination unit that identifies the tone signal, at each of the fixed time periods of the channels, based on the characteristic quantities determined by the characteristic quantity detection unit.

17. The tone detector as claimed in claim 16, wherein:
each of said measuring channels is respectively shifted by a time period of (M/N)T, where M equals a respective placement in sequence (0, 1, 2, . . . N−1) of the successively shifted channels, N equals the total number of said channels, and T equals the duration of the measuring time interval.

18. A tone detecting method for detecting a tone signal, the method comprising the steps of:
storing a tone signal successively input to the tone detector;
reading the tone signal at each of a fixed time period for each of a plurality of measuring channels that are divided into predetermined measuring time intervals, the predetermined time intervals of the channels being shifted with respect to each other by the fixed time period;
determining in parallel the respective characteristic quantities of the tone signal, at each of the fixed time periods, for the channels;
generating a notification signal after the characteristic quantities of the tone signal are determined; and identifying the tone signal, at each of the fixed time periods of the channels, based on the characteristic quantities determined for the channels.

19. The tone detecting method as claimed in claim 18, wherein:
the characteristic quantity detecting step includes sharing the tone signal characteristic quantities determined for each of the fixed time periods among the channels.

20. The tone detector method as claimed in claim 19, wherein:
each of said measuring channels is respectively shifted by a time period of (M/N)T, where M equals a respective placement in sequence (0, 1, 2, . . . N−1) of the successively shifted channels, N equals the total number of said channels, and T equals the duration of the measuring time interval.

21. The tone detecting method as claimed in claim 18, wherein:
the fixed time period is further subdivided into time units at which the tone signal may be identified;
the tone signal reading step includes reading the tone signal at each of the subdivided time units;
the characteristic quantity detecting step includes determining the characteristic quantity of the tone signal at each of the subdivided time units for each of the channels; and,
the tone identifying step includes identifying the tone signal at each of the subdivided time units of the channels.

22. The tone detecting method as claimed in claim 21, wherein:
the characteristic quantity detecting step includes sharing the tone signal characteristic quantities determined for each of the subdivided time units among the channels.

23. The tone detector method as claimed in claim 18, wherein:
each of said measuring channels is respectively shifted by a time period of (M/N)T, where M equals a respective placement in sequence (0, 1, 2, . . . N−1) of the successively shifted channels, N equals the total number of said channels, and T equals the duration of the measuring time interval.

24. A computer readable medium storing a tone detecting program that is run on a computer, the tone detecting program being executed by the computer to perform the steps of:
storing a tone signal successively input to the tone detector; reading the tone signal at each of a fixed time period for each of a plurality of measuring channels that are divided into predetermined measuring time intervals, the predetermined time intervals of the channels being shifted with respect to each other by the fixed time period;
determining in parallel the respective characteristic quantities of the tone signal at each of the fixed time periods of the channels;
generating a notification signal after the characteristic quantity of the tone signal is determined; and
identifying the tone signal, at each of the fixed time periods of the channels, based on the characteristic quantities determined for the channels.

* * * * *